United States Patent
Constantino et al.

(10) Patent No.: US 9,549,609 B2
(45) Date of Patent: Jan. 24, 2017

(54) MOBILE MULIMEDIA WORKSTATION

(71) Applicant: Myworld Mediastudio, Inc., Indialantic, FL (US)

(72) Inventors: Ronald James Constantino, Indialantic, FL (US); James Eric Preece, Indialantic, FL (US); Robert James Worzalla, West Melbourne, FL (US)

(73) Assignee: MyWorld Mediastudio, Indialantic, FL (US)

( * ) Notice: Subject to any disclaimer, the term of this patent is extended or adjusted under 35 U.S.C. 154(b) by 0 days.

(21) Appl. No.: 14/859,947

(22) Filed: Sep. 21, 2015

(65) Prior Publication Data

US 2016/0120303 A1 May 5, 2016

Related U.S. Application Data

(60) Provisional application No. 62/073,121, filed on Oct. 31, 2014.

(51) Int. Cl.
```
A47B 46/00    (2006.01)
A47B 21/04    (2006.01)
F16M 11/42    (2006.01)
H04N 5/28     (2006.01)
F16M 11/10    (2006.01)
```
(Continued)

(52) U.S. Cl.
CPC ............... A47B 21/04 (2013.01); A47B 21/02 (2013.01); A47B 21/03 (2013.01); F16M 11/10 (2013.01); F16M 11/2014 (2013.01); F16M 11/2092 (2013.01); F16M 11/24 (2013.01); F16M 11/40 (2013.01); F16M 11/42 (2013.01); F16M 13/022 (2013.01); H04N 5/28 (2013.01);
(Continued)

(58) Field of Classification Search
CPC .................... Y10T 24/44598; Y10T 24/44974; A47F 5/04; A47F 5/05; A47F 5/06; A47F 5/106; A47B 46/005; A47G 25/0664; A47G 25/0685; D06F 7/04; D06F 57/08
USPC ..................... 269/17, 71; 211/196, 197, 205; 248/229.14, 229.24, 228.5, 230.5, 231.61, 248/918; 108/151, 50.01, 50.02, 180, 182, 108/186, 189, 190; 280/79.3, 47.34, 280/47.35; 312/223.3
See application file for complete search history.

(56) References Cited

U.S. PATENT DOCUMENTS 385,650 A * 7/1888 Wemple ............. A01K 39/0106
119/465
1,220,578 A * 3/1917 Wise ..................... A47B 11/00
108/139

(Continued)

FOREIGN PATENT DOCUMENTS

GB 2473876 3/2011

*Primary Examiner* — Janet M Wilkens
(74) *Attorney, Agent, or Firm* — John L. DeAngelis; Beusse Wolter Sanks & Maire, PLLC

(57) ABSTRACT

A mobile multimedia workstation comprises a base, a mobile component attached to the base bottom side, first and second upright members attached to the top side and spaced apart to define an opening, a clamp comprising first and second clamp faces connected by an adjustable member positioned within the opening and adjustable to urge first and second clamp faces toward each other and in contact with front and rear surfaces of the first and second upright members to fix a position of the clamp along the first and (Continued)

second upright members, a first arm having a first end connected to the first clamp face through a pivot junction and a second end defining a slot, a post within the slot and a device connected to the post, a threaded member disposed through the slot for adjusting a slot width to restrain the post within the slot.

20 Claims, 13 Drawing Sheets

(51) Int. Cl.
| | |
|---|---|
| F16M 11/20 | (2006.01) |
| F16M 11/24 | (2006.01) |
| F16M 11/40 | (2006.01) |
| F16M 13/02 | (2006.01) |
| A47B 21/02 | (2006.01) |
| A47B 21/03 | (2006.01) |
| G03B 17/56 | (2006.01) |
| F16B 2/06 | (2006.01) |
| F16B 2/12 | (2006.01) |

(52) U.S. Cl.
CPC ............. *F16B 2/065* (2013.01); *F16B 2/12* (2013.01); *G03B 17/561* (2013.01)

(56) References Cited

U.S. PATENT DOCUMENTS

| | | | | |
|---|---|---|---|---|
| 1,502,685 | A * | 7/1924 | Sarfaty | F24D 19/00 211/119.008 |
| 1,516,489 | A * | 11/1924 | Barton | B60R 9/00 24/523 |
| 1,586,061 | A * | 5/1926 | Barton | B60R 9/00 24/343 |
| 2,048,009 | A * | 7/1936 | Kacena | E04G 1/32 182/227 |
| 2,608,762 | A * | 9/1952 | Fox | A61C 11/001 24/486 |
| 3,468,428 | A * | 9/1969 | Reibold | A47F 5/06 108/103 |
| D260,400 | S * | 8/1981 | Carvel | 248/125.2 |
| 4,546,708 | A * | 10/1985 | Wilburth | A47B 11/00 108/103 |
| 4,805,938 | A * | 2/1989 | Redmond | B62B 9/00 24/569 |
| 5,411,153 | A * | 5/1995 | Unfried | A47B 87/0215 108/180 |
| 5,588,659 | A * | 12/1996 | Boes | B25H 3/04 206/378 |
| 5,630,566 | A * | 5/1997 | Case | A47B 23/046 248/122.1 |
| 5,848,773 | A * | 12/1998 | Bourassa | A47C 7/70 248/223.41 |
| 5,975,469 | A * | 11/1999 | Chen | A47B 21/0371 248/118.1 |
| 6,796,536 | B1 | 9/2004 | Sevier | |
| 7,028,961 | B1 * | 4/2006 | Dittmer | F16M 11/04 248/278.1 |
| 7,063,296 | B2 * | 6/2006 | Williams | F16M 11/04 248/244 |
| 7,178,469 | B2 * | 2/2007 | Goza | A47B 21/0314 108/50.01 |
| 7,191,923 | B1 | 3/2007 | Kundig | |
| 7,222,826 | B1 * | 5/2007 | Berglund | A47B 21/0314 248/118 |
| 7,261,261 | B2 * | 8/2007 | Ligertwood | A47B 21/00 248/129 |
| 7,942,372 | B2 * | 5/2011 | Koh | B43L 1/004 248/124.1 |
| 8,561,550 | B2 * | 10/2013 | Raml | A47B 5/00 108/152 |
| 2003/0122045 | A1 | 7/2003 | Mulford | |
| 2004/0046098 | A1 * | 3/2004 | Painchaud | A45B 25/12 248/534 |
| 2005/0229823 | A1 * | 10/2005 | Weatherly | A47B 5/02 108/182 |
| 2005/0275178 | A1 * | 12/2005 | Huesdash | A47B 57/482 280/47.35 |
| 2007/0160364 | A1 | 7/2007 | Peika | |
| 2010/0019548 | A1 * | 1/2010 | Tajbakhsh | A47B 21/00 297/162 |
| 2010/0134695 | A1 | 6/2010 | O'Connell | |
| 2010/0187785 | A1 * | 7/2010 | Knappe | A61G 12/001 280/47.34 |
| 2010/0213151 | A1 * | 8/2010 | Theesfeld | A47B 57/06 211/151 |
| 2010/0296801 | A1 | 11/2010 | Lane | |
| 2014/0070059 | A1 * | 3/2014 | Vieira | F16M 11/041 248/122.1 |
| 2014/0130719 | A1 * | 5/2014 | Raml | A47B 5/00 108/42 |
| 2014/0218615 | A1 | 8/2014 | Williams | |

\* cited by examiner

MOBILE MULIMEDIA WORKSTATION

CROSS REFERENCE TO RELATED APPLICATION

This patent application claims benefit of the Oct. 31, 2014 filing date of provisional patent application No. 62/073,121, which is incorporated by reference herein in its entirety.

FIELD

This invention relates to workstations, and more particularly, to a mobile multimedia workstation device having a flexible configuration and adaptable to accept and orient various devices, e.g., cameras, lights, platforms, smart phones, tablet computers.

BACKGROUND

Most off-the-shelf (OTS) image capture solutions provide inaccurate lighting and poor color balance on subjects during photography, video capture, videoconferencing and remote graphics display. These prior art solutions also offer extremely poor control and stability for multiple cameras and devices when operated by an individual operator. Computer operators involved in capturing and processing video and graphics must frequently vary their position from sitting to standing during long-duration tasks. Professional production studios with their overhead costs are very expensive. Existing OTS products do not offer the flexibility and multiple features that may be required for a particular work environment, especially for an operator working alone.

As can be seen, there is a need for a mobile multimedia workstation device that solves the disadvantages described above by transforming a regular room without any video production capabilities into a studio-quality photography and video studio.

BRIEF DESCRIPTION OF THE DRAWINGS

The invention is explained in the following description in view of the drawings.

DETAILED DESCRIPTION

The following detailed description is of the best currently contemplated modes of carrying out exemplary embodiments of the invention. The description is not to be taken in a limiting sense, but is provided merely for the purpose of illustrating the general principles of the invention, since the scope of the invention embodiments are best defined by the appended claims.

Figure 1A:
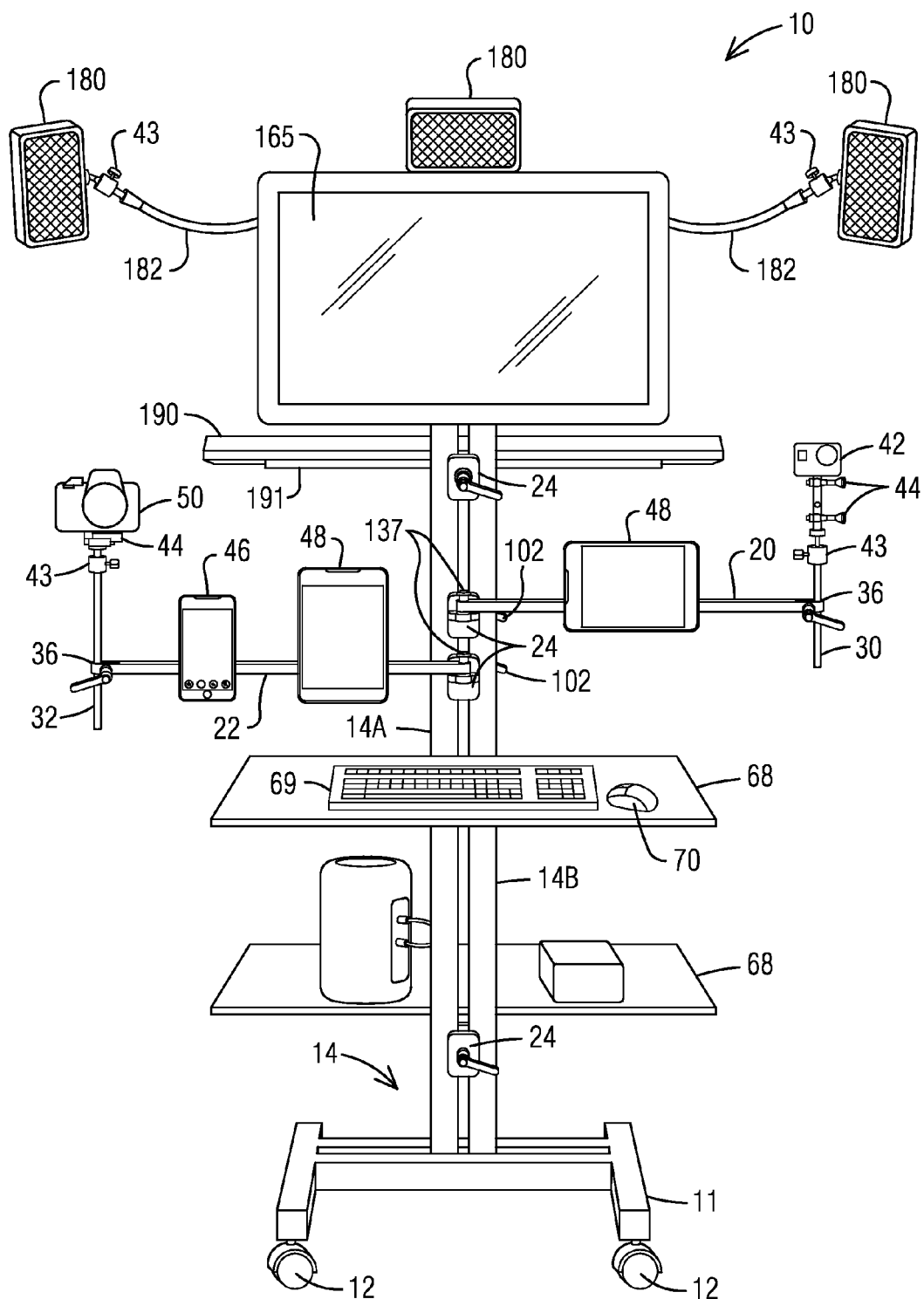
FIGS. 1A and 1B are front views of alternative embodiments of a mobile multimedia workstation.

With reference to FIG. 1A, a mobile multimedia workstation 10 comprises a base 11 that may include at least one mobile component such as four caster wheels 12 or the like. The workstation 10 is mobile and therefore may be easily moved as needed.

Preferably a material of the base 11 comprises a strong, rigid material that provides stability and mobility for the workstation. The base 11 also provides substantial stability for any configuration of devices and any position and length of articulating and fixed mounts, arms and devices affixed to those mounts and arms.

An upright member 14 is attached to a top side of the base 11. Although the upright member 14 is depicted in FIG. 1 as comprising two proximate upright sub-members 14A and 14B, such is not required as one upright member may suffice. In other embodiments and applications three or more upright members or a single upright member may comprise the upright member 14.

The upright member 14 (i.e., the two upright sub-members 14A and 14B) may be offset slightly from a center of the base 11 toward a rear of the base (see FIG. 1A for example) so that the centers of gravity of the attached devices and the workstation structural members will be approximately centered between the wheels 12 when platforms, monitors, devices, etc. are mounted at various locations on the upright member 14 and at various distances from the upright member 14.

The base 11 may be filled with dense material to provide extra stabilization in applications where large masses (such as multiple monitors) are attached to upper regions of the workstation 10. In these applications the base 11 is sealed and capped to prevent spillage of the ballast material.

The upright sub-members 14A and 14B may have a square, rectangular or circular cross-sectional shape and may comprise telescoping or separable pieces, in modular fashion, for more convenient shipping or adjustment purposes.

In certain embodiments, the base 11 and the upright member 14 may be made from metal or the like. The material may be sandblasted, primed, coated and texture added. The base 11 and the upright member 14 may then be drilled, machined and tapped to prepare for assembly of the multimedia workstation.

Figure 13:
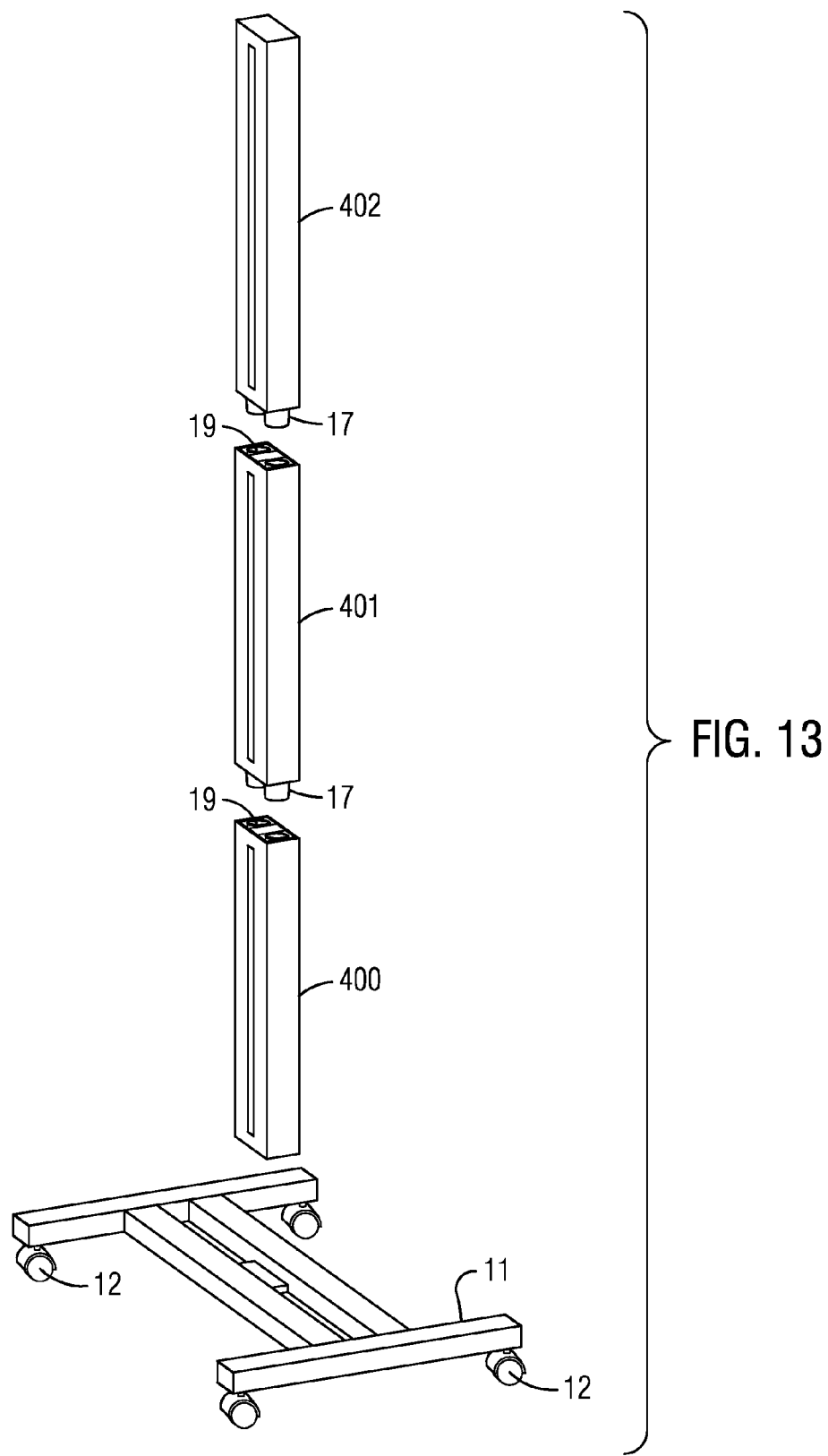
FIG. 13 illustrates a sectionalized upright member of FIGS. 1A and 1B.

In a preferred embodiment, the upright sub-members 14A and 14B form an assembly with the assembly further comprising three segments 400, 401, and 402 as illustrated in FIG. 13. The segment 400 is attached to the base 11.

Figure 9:
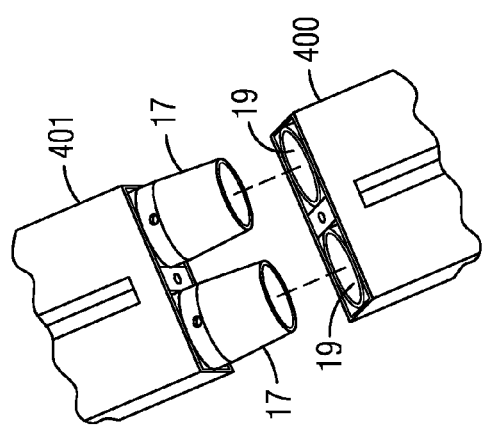
FIG. 9 illustrates components associated with joints in the upright members of FIGS. 1A and 1B.

FIG. 9 is a close-up view of the interface between the segments 400 and 401 and further illustrates protrusions 17 on the segment 400, for example, for receiving in openings 19 within the segment 401, for example. Mating of these protrusions and openings, as illustrated in FIGS. 9 and 13, firmly affix the segments 400, 401, and 402 to form the upright sub-members 14A and 14B.

The middle upright segment 401 of FIG. 13 can comprise either male or female joining members for joining with a converse component on the segments 400 and 402.

The upright member 14 (i.e., the upright sub-members 14A and 14B) provides, in its many different embodiments, stable, vertically adjustable, and/or telescoping attachment points for all shelves, arms, posts, etc., and all devices that may be rigidly or moveably affixed thereto. The attachment points may be affixed to a front or back surface of the upright member 14, thereby allowing full 360 degrees of freedom for articulating and moveable arms and mounts. The upright member may provide wire management and device connectivity via strategically placed cutouts, jacks, and plugs.

As described herein, the user may affix various devices to the upright member 14 using conventional components or using novel clamps and arms designed for use with the mobile multimedia workstation of the present invention.

With reference to FIG. 1A, arms 20 and 22 extend substantially horizontally from the upright member 14 and are attached to the upright member 14 by a clamp 24 disposed between the upright sub-members 14A and 14B and removably clamped against each of the upright sub-members.

The clamp 24 and its associated components allow the arms 20 and 22 to rotate about the upright member 14 and to be conveniently relocated to different locations on the upright member 14. Operation of the clamp 24 and its associated components is described further below.

FIG. 1A depicts an embodiment wherein the arms 20 and 22 are affixed to the upright member 14 with the clamp 24 and its first associated components in such a manner that the arms cannot be readily removed from clamp 24.

Figure 1B:
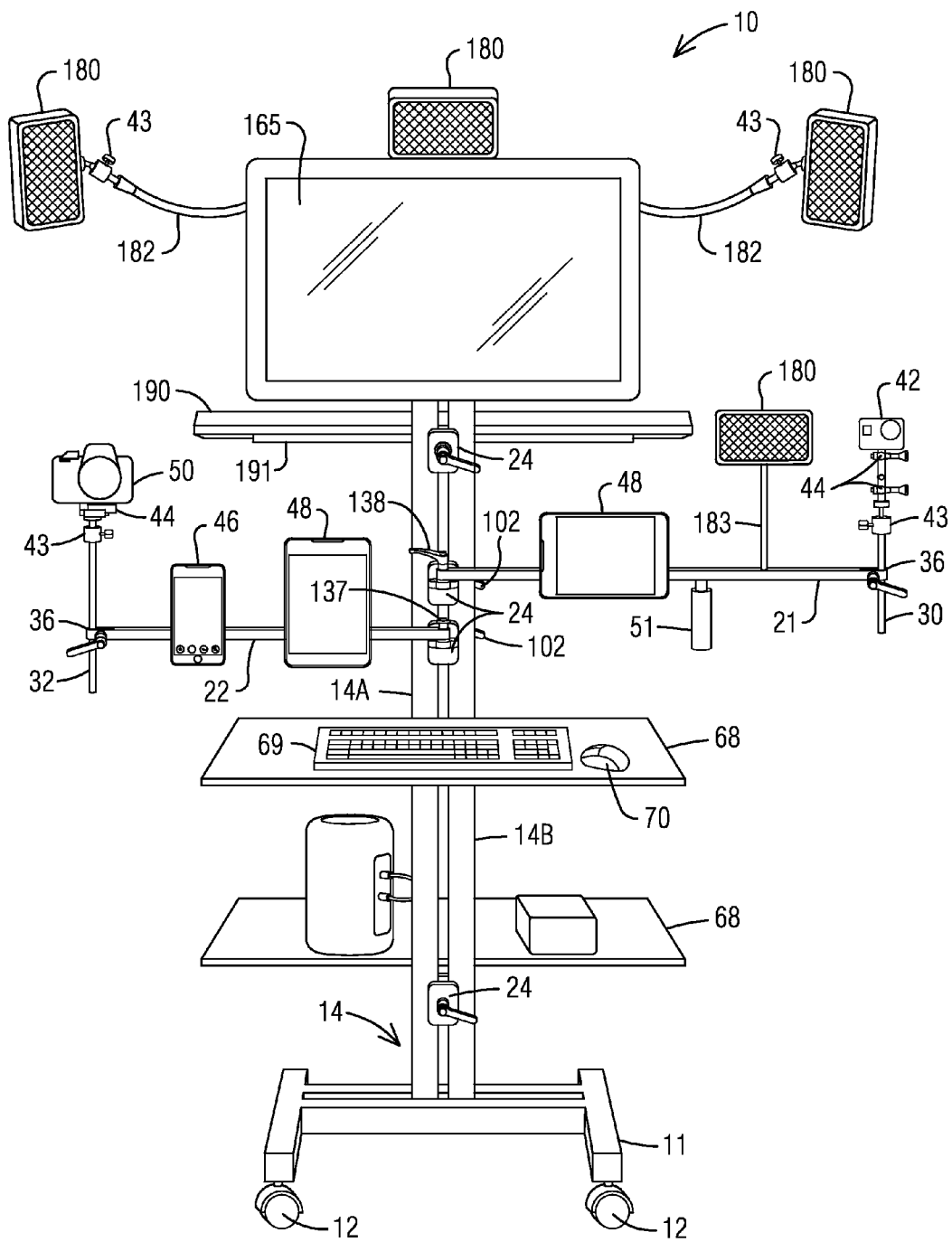

FIG. 1B depicts an embodiment wherein an arm 21 is affixed to the upright member 14 with the clamp 24 and its second associated components in such a manner that the arm 21 can be easily removed. But the arm 22 of FIG. 1B is attached to the upright member 14 in the same manner as depicted in FIG. 1A.

Figure 3:
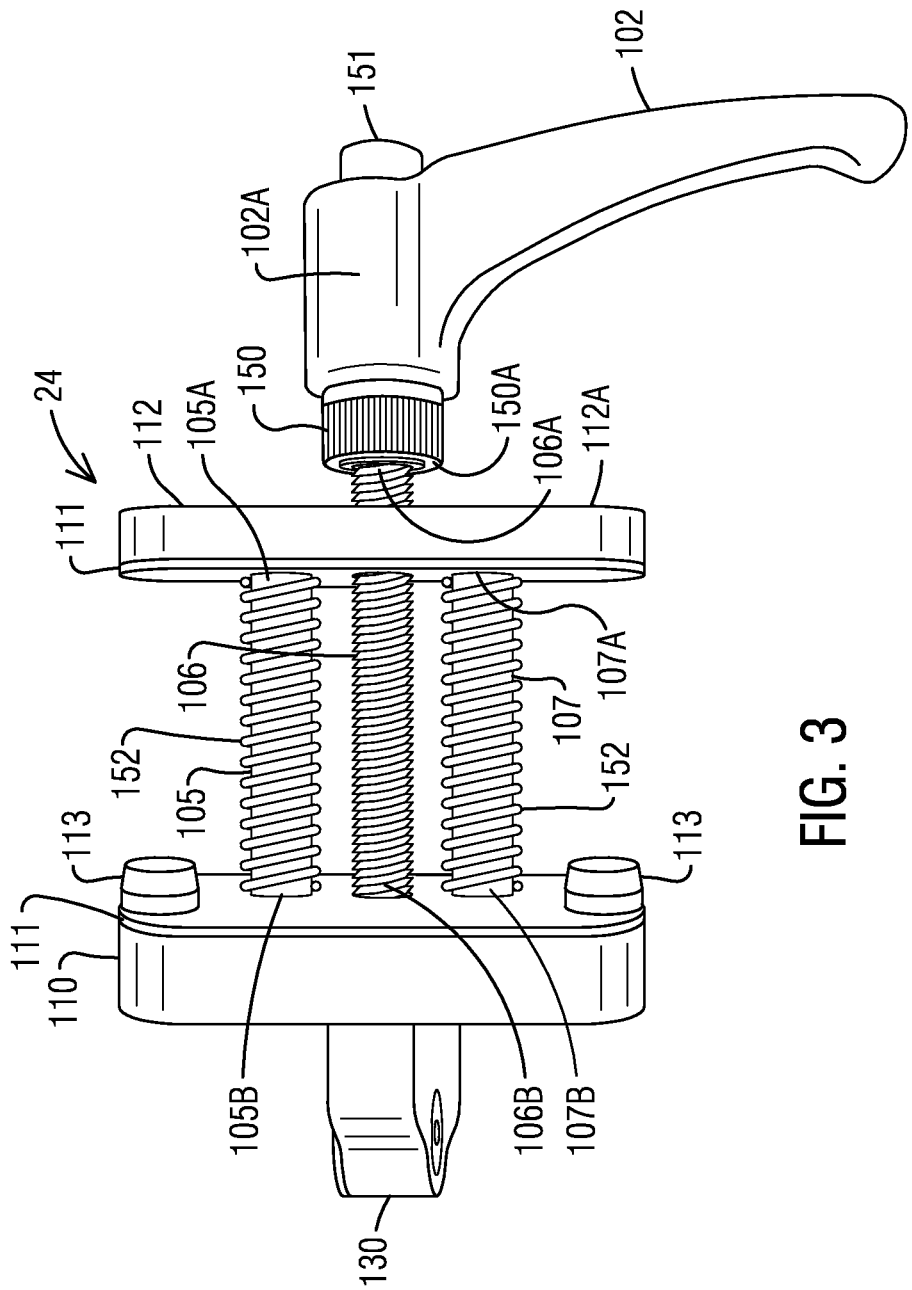
FIG. 3 illustrates a clamp of the mobile multimedia workstation.

FIG. 3 is a detailed view of the clamp 24 comprising a quick release handle 102. Three rods 105, 106, and 107 are disposed between clamp faces 110 and 112. These three rods are used for alignment and clamping functions of the clamp 24 as described below.

An end 106B of the middle (fastening) rod 106 threadably engages a threaded opening in the clamp face 110 to fixedly attach the end 106B in the clamp face 110.

An end 106A of the rod 106 passes through an opening in the clamp face 112, threadably engages the clamp handle 102, and extends into an interior region 102A of the clamp handle 102.

An end 105A and 107A of respective alignment rods 105 and 107 is secured within respective openings in the clamp face 112. Each end 105B and 107B passes freely through a respective opening in the clamp face 110. Operation of the alignment rods 105 and 107 is described below.

A threaded fastener 150 serves as a threaded capture component for the rod 106.

As the handle 102 is rotated on the rod 106 in a first direction, the end 106A is driven into the interior region 102A. When a surface 150A of the threaded fastener 150 contacts a surface 112A of the clamp face 112, further rotation of the handle 102 moves the clamp face 112 toward the clamp face 110. However a length of the rod 106 is selected such that the handle 102 can be rotated only until a distance between the clamp faces is slightly less than a width of the upright member 14 (where the width is about two inches). That is, the handle 102 can be rotated until a compressive force is exerted between the clamp faces 110 and 112 when the clamp 24 is mounted on the upright member 14.

In an embodiment where the width of the upright member differs from about 2 inches the length of the rod 106 and the alignment rod 105 and alignment rod 107 must be changed to permit the clamp faces 110 and 112 to close with a separation distance less than the upright member 14.

Rotation of the handle 102 in a second direction opposite to the first direction drives the end 106A of the rod 106 out from the interior region 102A. With continued turning of the handle 102, eventually the handle is turned off from the rod 106.

A material sheet 111 (such as comprising a high-density thermoplastic material) is mounted to an inside-facing surface of the clamp face 110 and to an inside-facing surface of the clamp face 112. Alignment components 113 extend from the material sheet 111 on the clamp face 110.

When the clamp 24 is clamped to the upright sub-members 14A and 14B (see FIG. 2A or 2B, for example) the alignment components 113 fit between the upright sub-members to align the clamp relative to the upright members. The material sheets 111 are then in contact with the upright sub-members 14A and 14B to prevent physical marring of the upright sub-members.

The two outside (alignment) rods 105 and 107 maintain alignment between the two clamp faces 110 and 112 and are also disposed between the upright sub-members 14A and 14B when the clamp 24 is clamped to the upright sub-members.

An end 105A and 107A of respective alignment rods 105 and 107 is secured within respective openings in the clamp face 112. Each end 105B and 107B passes freely through a respective opening in the clamp face 110. As the handle 102 is rotated and the clamp face 112 is driven toward the clamp face 110, ends 105B and 107B extend through their respective openings in and beyond (outboard of) the clamp face 110.

The rods 105 and 107 provide alignment between the two clamp faces 110 and 112. As the clamp face 112 moves toward the clamp face 110 the ends 105B and 107B extend through their respective openings and outside of the clamp face 110 (outboard).

One embodiment of the clamp 24 comprises a spring 152 concentrically mounted on each rod 105 and 107 to urge the clamp face 112 away from the clamp face 110 as the handle 102 moves away from the surface 112A of the clamp face 112.

A button 151 controls a clutch or ratchet associated with rotation of the handle 102 of the clamp 24. When the button 151 is pushed the handle 102 is disconnected from the threaded rod 106 (i.e., the clutch mechanism is disengaged), and the handle can be turned freely in either direction without movement of the rod 106 into or out from the interior region 102A of the handle 102. Typically the button 151 is pushed when the user desires to reposition the handle 102 to a better or more convenient position, e.g., to gain additional leverage in turning the handle.

When the button 151 is released, the clutch engages and the handle 102 can be turned in either direction, i.e., turning the handle 102 on to or off from the threaded rod 106.

The clamp 24 comprises a boss 130 affixed to an outside facing surface of the clamp face 110.

Figure 14:
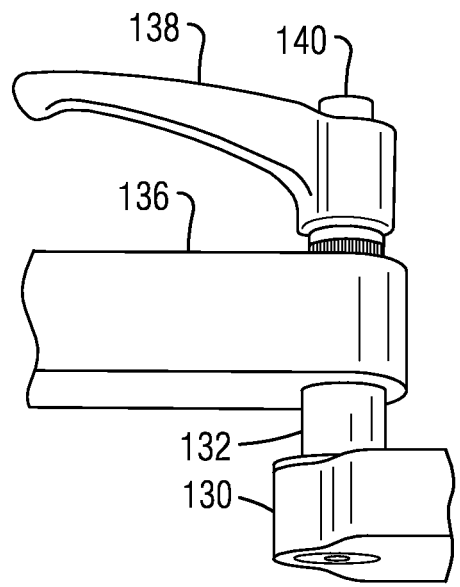
FIGS. 14 and 15 illustrate alternative embodiments for attachment components for the clamp of FIG. 3.

In one application as shown in FIG. 14, an opening within the boss 130 receives a rod 132 that passes through an arm 136, for example. A quick release handle 138 is attached to the rod 132 above the arm 136. The quick release handle 138 secures the arm 136 to the rod 132 and functions in a similar manner to the clamp 24.

Figure 15:
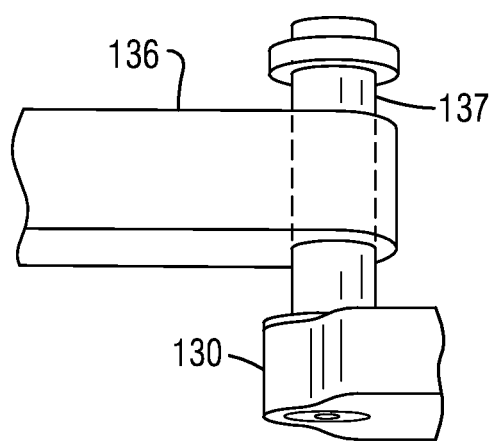

In another embodiment as illustrated in FIG. 15, the opening within the boss 130 receives a pin 137 for attaching the arm 136 to the boss, and thus to the clamp 24.

Thus the embodiment illustrated in FIG. 14 may be characterized as a quick-release embodiment as operation of the handle 138 allows quick separation of the arm 136 from the boss 130 and thus from the clamp 24. But the embodiment of FIG. 15 does not include the quick release components and therefore cannot be characterized as a quick release attachment.

The arm 136 of FIG. 15 may be considered one or both of the arms 20 and 22 in the FIG. 1A as in FIG. 1A both arms 20 and 22 are attached to the clamp 24 using the pin 137 and the arms cannot be conveniently quickly removed from the upright member 14.

The arm 136 of FIG. 14 may be considered the arm 21 of FIG. 1B as in this Figure the arm 21 is attached to the clamp 24 with the quick release handle 138 and can therefore be easily disconnected from the boss 130 and therefore from the clamp 24/upright member 14.

As described further below, several devices are typically attached to the arm 21 of FIG. 1B and these too can be easily carried about with the arm 21 after release from the upright member 14. To facilitate carrying the arm 21, as shown in FIG. 1B the arm 21 comprises a handle 51 for carrying the arm and its attached devices. For example, it may be desired to separate the arm 21 from the upright member 14 by disconnecting from the clamp 24 to conveniently allow full mobility of the arm 21 apart from the workstation, such as for taking close-up photographs with the camera 42.

Figure 2A:
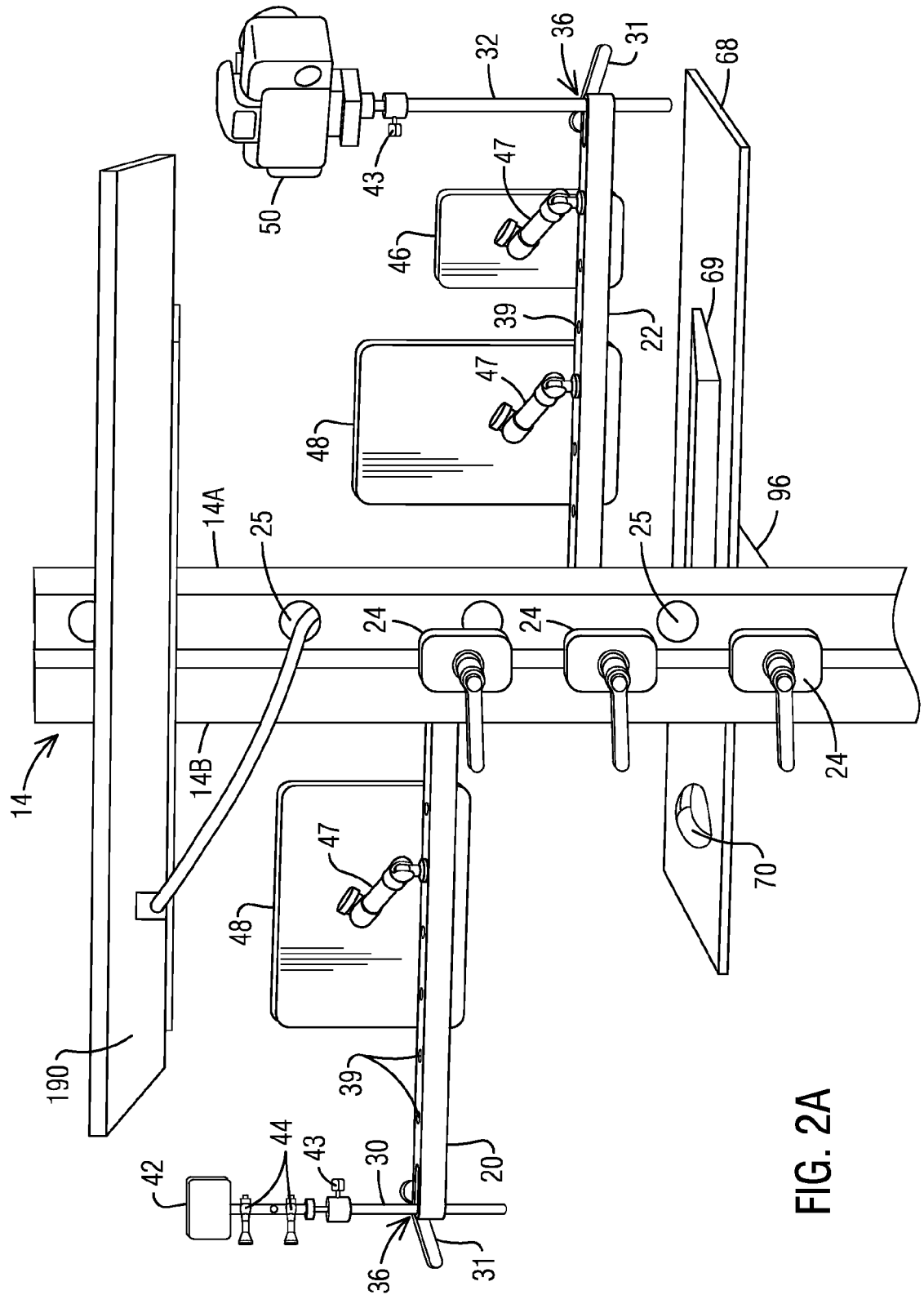
FIGS. 2A and 2B are partial rear views of the alternative embodiments of the mobile multimedia workstation of FIGS. 1A and 1B.

In the front views of FIGS. 1A and 2A the clamp 24 is connected to each of the arms 20 and 22 with the handle 102 proximate a rear surface of the mobile multimedia workstation 10 and therefore nearly hidden from view in these front views. However, in use, one or both of the clamps 24 can be clamped to the upright member 14 from either the front or rear surface (i.e., the handle 102 can be located proximate either the front or rear surface of the upright member 14) as determined by the configuration of the device or arm to be attached to the clamp 24.

If it is desired to only vertically reposition the clamp 24, the user turns the handle 102 to reduce the compressive force exerted by the clamp faces 110 and 112 on the upright member 14, moves the clamp vertically, and finally re-clamps the clamp at a different location on the upright member 14 by tightening of the handle 102 to move the clamp face 112 toward the clamp face 110 and reapply the compressive force at this new location. It is not necessary to disassemble the clamp 24 if the user only wants to slide the clamp to a higher or lower position on the upright member 14.

But if a device or component interferes with simply sliding the clamp up or down along the upright member 14, or the user wants to remove the clamp 24 from the upright member 14 the user loosens and removes the handle 102, removes the clamp face 112, and finally removes the clamp face 110 from between the upright sub-members 14A and 14B. Of course, any devices attached to the clamp face 110 are also removed from the upright sub-members 14A and 14B.

Various arms (such as the arms 20, 21 and 22 may be attached to the clamp face 110 and various devices may be attached to the arms.

Continuing with a description of FIG. 1A, a smart phone 46 and an electronic tablet 48 (oriented in a portrait direction), such as an Apple iPad, are connected to the arm 22. Another electronic tablet 48 (oriented in a landscape direction) is connected to the arm 20. The electronic tablets 48 and the smart phone 46 are attached to their respective arms 20/22 using swiveling connecting members 47 as illustrated in the partial rear view of FIG. 2A.

In FIG. 1A posts 30 and 32 are vertically moveably affixed to an end of the respective arms 20 and 22 using a clamp 36, which is further described below in conjunction with FIGS. 4 and 5.

A camera 50 is attached to an end of the post 32 using connecting components 43. Similarly, a camera 42 is attached to the post 30 using connecting components 43 and 44. The clamps 43/44 permit easy removal and reattachment of the cameras 42 and 50. Such clamps may have two or three degrees of freedom to position devices attached thereto. For example, the clamps 43 permit swiveling of any device attached thereto.

The various described devices are attached to their respective support members and arms using attachment components dependent on attachment features of both the device to be mounted and the support member to which it is attached. The attachment components may comprise strong magnets, non-damaging threaded clamps, standard camera mounts or the like, some of which are described in detail herein and represent inventive feature of the mobile multimedia workstation.

For example, with reference to the electronic tablets 48 or the smart phone 46, the various adjustable features and adjustable mating joints (e.g., articulating arms) inherent in the mounting and attaching connecting members 47 (see FIG. 2A) for these devices enable an operator to position these devices to view live on-screen images from a sitting or a standing position. As known by those skilled in the art, articulating arms and adjustable joints offer infinite adjustable positions (e.g., rotation, translation) for the components attached thereto.

Also, communications devices, such as the electronic tablet 48 and the smart phone 46, whether communicating through a cellular over-the-air connection, a Wi-Fi connection, or another communications network, allow the operator to access the Internet, send and receive streaming data, and make and receive phone calls at the workstation 10.

The spaced-apart distribution of the various components and devices attached either directly or indirectly to the upright member 14 permits maximum line-of-sight and prevents obstruction of viewing the various image-capturing devices mounted to the workstation. This distribution also permits maximum airflow between and proximate the components and devices for cooling purposes.

Returning to FIG. 1A, shelves or platforms 68 are mounted to the upright member 14 at any desired vertical location along the upright member. The shelves may be rigidly affixed or vertically moveably affixed to the upright member 14 and the vertical position may be adjusted along the vertical axis of upright member. In one embodiment, the platforms 68 are each supported by an arm 96 that is in turn supported by the clamp 24 (see FIG. 2A) attached to the upright member 14. The arm 96 operating in conjunction with the clamp 24 allows raising and lower of the platform 96.

The platforms 68 may be used to support devices that typically rest on a flat surface during use and may be appropriate for devices such as, but not limited to, speakers, a computer, a keyboard 69, a mouse 70, and other items easily accessible from a seated or standing position. The shelves 68 may also be used for product photography, i.e., positioning a product on the shelf for taking a photo.

A monitor 165 may be attached to the upright member 14 using a coupler that allows swiveling and tilting (both left-right and up-down) of the monitor 165. One example of such a coupler is described below in conjunction with FIGS. 6 and 7.

Continuing with FIGS. 1A and 2A, light-emitting diode (LED) panels 180 may be attached (e.g., removably attached) directly to the upright member 14 or to other attachment mechanisms attached to the upright member 14. For example, the LED panels 180 may be connected to the upright member 14 (or to a mating member attached to the upright member 14) through the connecting components 43 and a gooseneck arm 182 that allow the angle, orientation, and position of the LED panel to be adjusted according to need. The connecting components 43 and the gooseneck arms 182 permit repositioning of the LED panels in any direction relative to the upright member 14.

The LED panels 180 may be of high-quality color and intensity and may be adjustable and may be used to supply accurate lighting with regard to color, temperature and contrast to provide studio-accurate color. Adjustment of the LED panels 180 can easily accommodate the photo subject and the ambient lighting in the environment.

In one embodiment, a sound bar 190 (see the front view of FIG. 1A and the partial rear view of FIG. 2A) sets on a shelf 191 that is moveably affixed to the upright member 14 through use of the clamp 24. The sound bar 190 can be adjusted vertically and horizontally and tilted to accurately image any sound environment for use in composing, playback, and recording. Thus the workstation can function as a mobile recording studio.

Turning now to an alternative embodiment of FIGS. 1B (front view) and 2B (partial rear view), as described above, FIG. 1B depicts an embodiment with the arm 21 in lieu of the arm 20. The arm 21 carries the handle 51. Also in FIGS. 1B and 2B another LED panel 180 is attached to a post 183 that is in turn inserted into an opening 39 in the arm 21 or otherwise affixed to the arm 21.

Figure 2B:
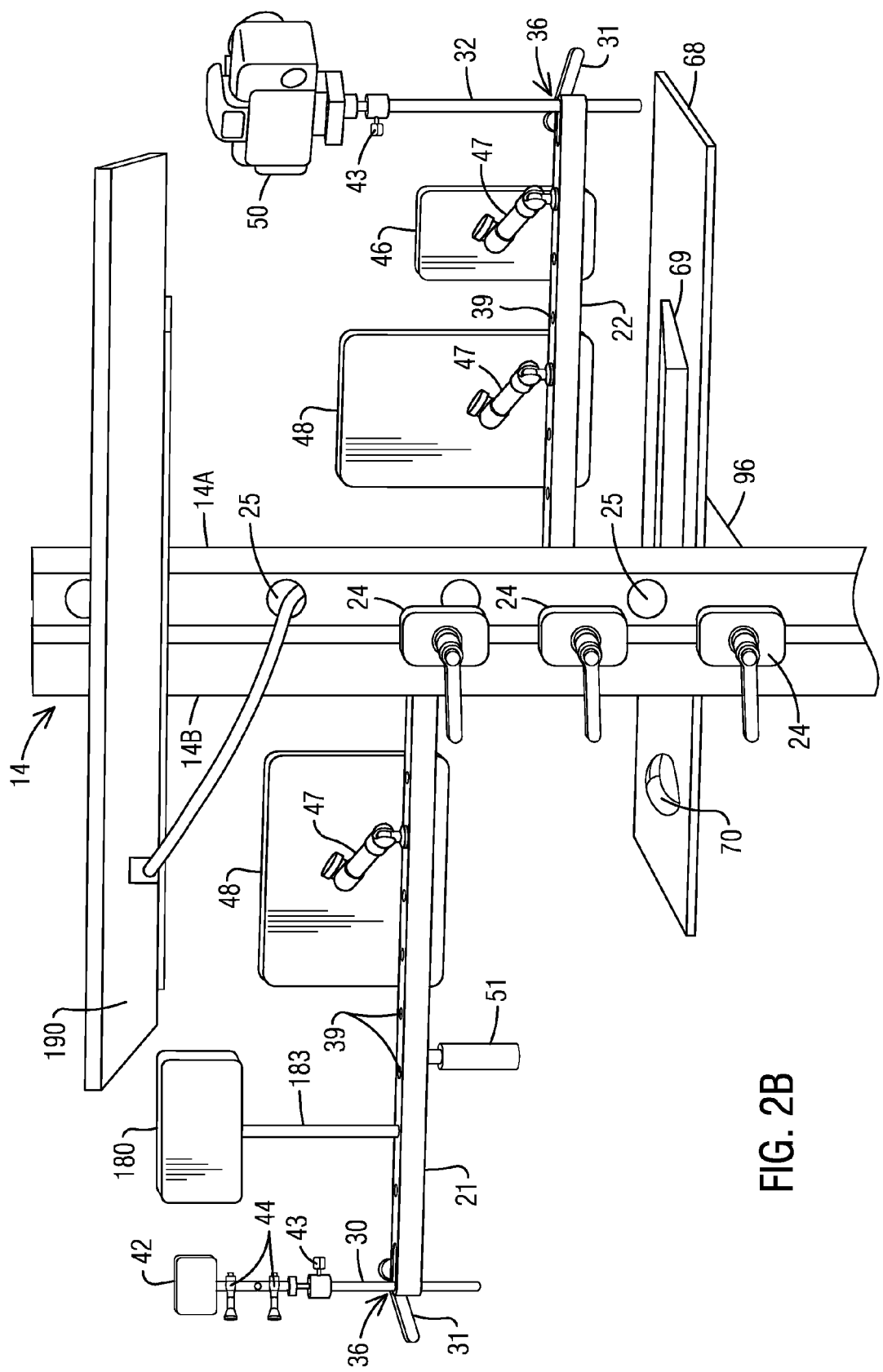

With reference to the rear views of FIGS. 2A and 2B, each illustrates cut-outs or openings 25 through which wires and cables can pass for connection to the various electronic devices affixed to the mobile multimedia workstation 10.

Figure 4:
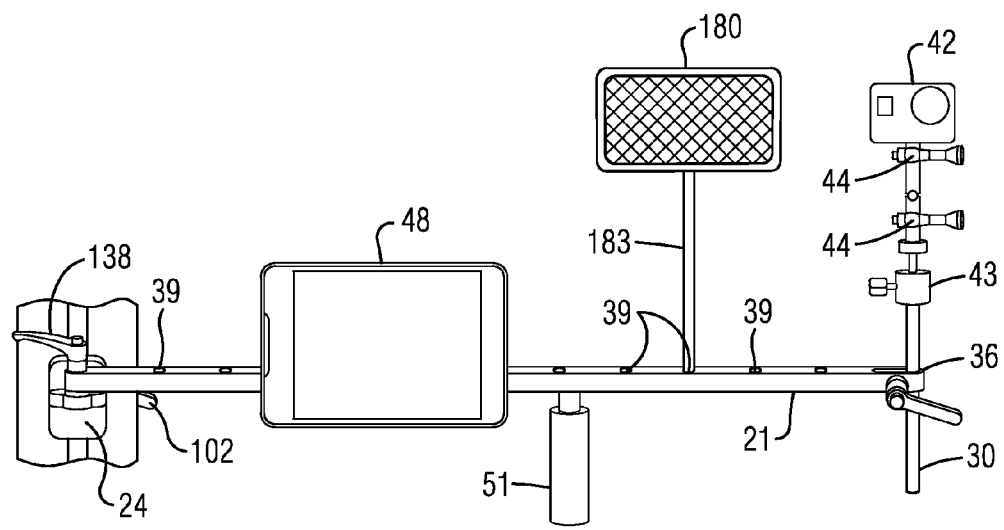
FIG. 4 illustrates an arm for use in one embodiment of the mobile multimedia workstation of the present invention.

FIG. 4 is a close-up view of the arm 21 illustrating in particular the openings 39, which are also defined in the arms 20 and 22 (sees FIGS. 2A and 2B where, for example, an end of each connecting member 47 is received within an opening 39). With respect to the arm 21, the rod 183 is received within one opening 39. Variously styled pins and rods can also be inserted into the openings 39 for supporting various devices and components, including, for example, relatively small monitors.

Figure 5:
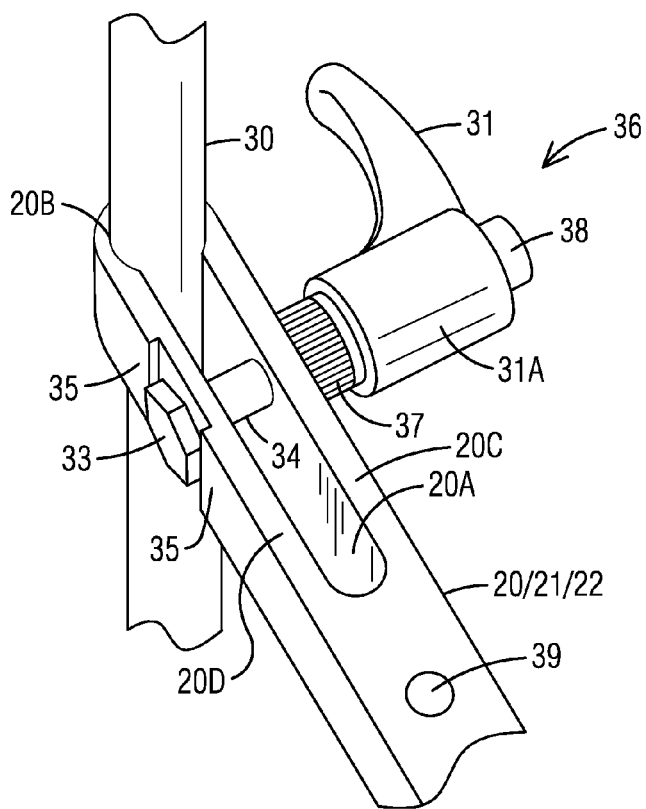
FIG. 5 illustrates a coupler for use with arm of the mobile multimedia workstation.

FIG. 5 illustrates a close-up view of an end of the arm 20, for example, although the arms 21 and 22 may be similarly configured. The arm 20 defines an elongated slot 20A therein for receiving the post 30 within a notched region 20B of the slot 20A.

Rotation of a handle 31 along a threaded rod 34 (which is terminated in a bolt head 33 constrained from rotation by a collar 35) squeezes together segments 20C and 20D to tighten the post 30 within the slot 20A. When the handle 31 is loosened, the compressive force on the segments 20C and 20D is released and the post 30 can be raised or lowered vertically and rotated to provide an infinite range of positions and orientations for any device attached thereto.

Note that as the handle 31 is rotated and moves along the threaded rod 34, a segment of the threaded rod extends into a region 31A of the handle 31. Thus a length of the threaded rod 34 must be properly selected to ensure there is sufficient clearance for the threaded rod 34 as it extends into the region 31A so that a compressive force can be applied to squeeze the segments 20C and 20D.

A threaded fastener 37 serves as a threaded capture component for the handle 31 and the rod 34 and comprises serrated or flat surfaces that fit into a female receptacle (not shown) in the handle 31.

When the threaded fastener 37 is threaded out from the female receptacle the handle 31 can be turned along the rod 34 to reduce or increase the compressive forces exerted on the post 30 within the elongated slot 20A. The handle 31 and its threaded fastener 37 effectively makes the handle a nut that can be tightened or loosened on the threaded rod 34, driving the segment 20C toward 20D, thereby compressing the elongated slot 20.

A button 38 controls a clutch or ratchet associated with rotation of the handle 31. When the button 38 is depressed the handle 31 is disconnected from the threaded rod 34 (i.e., the clutch mechanism is disengaged), and the handle can be turned freely without movement along the threaded rod 34. Typically the user depresses the button 38 when she desires to reposition the handle 31 to a better or more convenient position, e.g., to gain additional leverage in turning the handle. When the button 38 is released, the clutch engages and turning the handle 31 moves the handle along the threaded rod 34.

Figure 6:
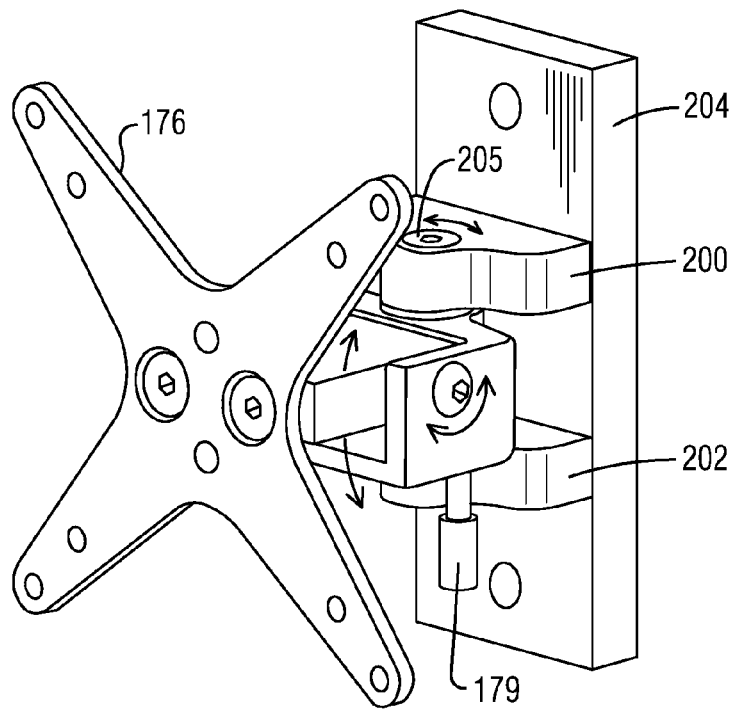
FIG. 6 illustrates a coupler having several degrees of freedom for use with the mobile multimedia workstation.
Figure 7:
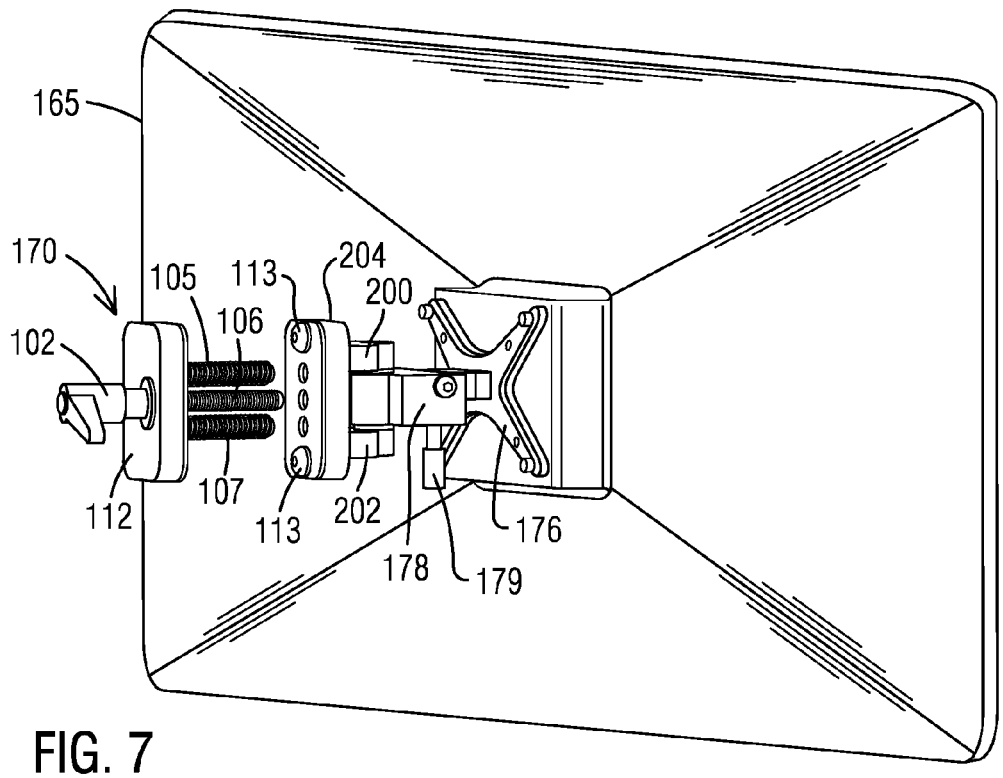
FIG. 7 illustrates a coupler attached to a monitor.

With reference to FIGS. 6 and 7, a clamp 170 comprising certain components similar to the clamp 24, can be used for attaching the monitor 165 to the upright member 14. The clamp 170 differs from the clamp 24 of FIG. 3 in that the clamp face 110 having a single boss 130 extending therefrom in the clamp 170 has been replaced by a clamp face 204 having two spaced apart bosses 200 and 202 extending therefrom.

Like the clamp 24, the clamp 170 can be moved vertically along the upright member 14 by loosening, repositioning and then retightening the handle 102. This adjustment provision can accommodate a sitting or standing operator to provide convenient access to the monitor 165, for example.

With continuing reference to FIGS. 6 and 7, a four-armed plate 176 is attached to a back surface of the monitor 165 and attached to the bosses 200 and 202 via a moveable joint component 178. A pin 205 (see FIG. 6) passes through aligned openings in the bosses 200 and 202 and the component 178 to link the three components together. In one embodiment the monitor 165 can be tilted or swiveled along two axes by action of the moveable joint component 178. These movements are depicted by arrowheads in FIG. 6. An elongated thumb screw 179 depicted in FIGS. 6 and 7 is threadable into or out from the moveable joint component 178 to limit downward tilting of the moveable joint component and therefore the monitor 165 to which the moveable joint component is attached.

In addition to its use to support the monitor 165, the clamp 170 may be used to support a variety of devices such as cameras, lights, tablet computers, and the like to position them in relation to one another with a high degree of flexibility in position, translation and rotation, while maintaining significant spatial stability and rigidity. For example, a large screen display or an equipment shelf may be mounted parallel to the floor and may require one or more axes of movement while a camera or a light panel may be mounted with multiple axes of movement.

Figure 8:
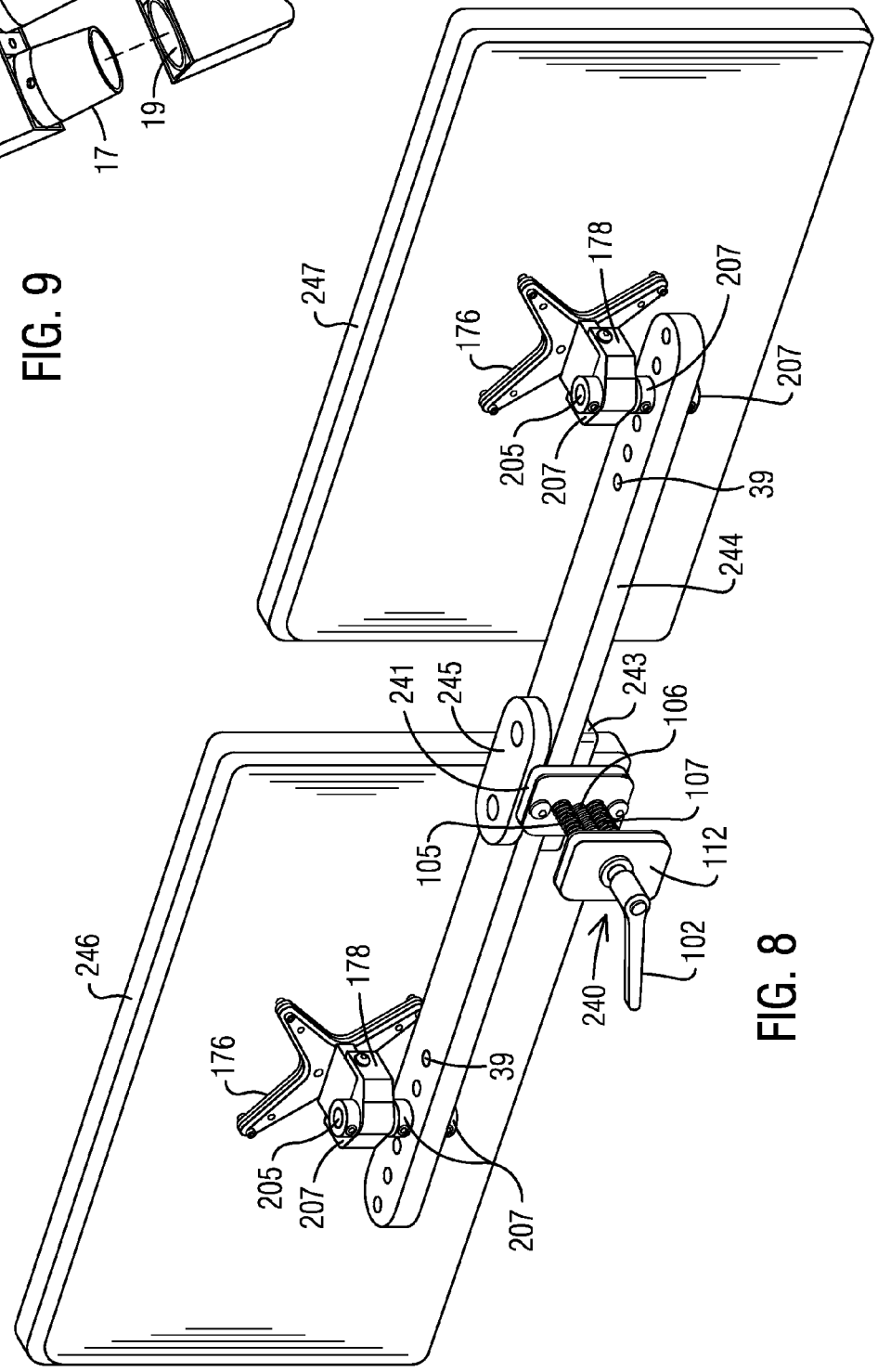
FIG. 8 illustrates two couplers attached to each one of two monitors.

FIG. 8 illustrates a clamp 240, similar in certain respects to the clamp 24 described above. The clamp 240 comprises the clamp face 112 and a clamp face 241 having a boss 243 extending therefrom. A bar 244 is captured and secured between the boss 243 and a plate 245, in one embodiment using machine bolts and mating nuts that pass through aligned openings in the plate 245, the bar 244, and the boss 243.

Two plates 176 are each individually attached to a rear surface of a monitor 246 and 247 and further attached to the moveable joint component 178. The pin 205 passes through an opening in each moveable joint component 178, similar to the arrangement of FIG. 6. Each moveable joint component 178 is secured to the bar 244 by inserting the pin 205 into an opening defined in each component 178 and into one of the openings 39 in the bar 244. Collars 207 attached to each pin 205 secure the pins within the openings.

In lieu of a single elongated bar 244, two bars placed end-to-end can be used with the two bars functioning as a single bar by joining the two bars between the plate 245 and the boss 243.

Figure 10:
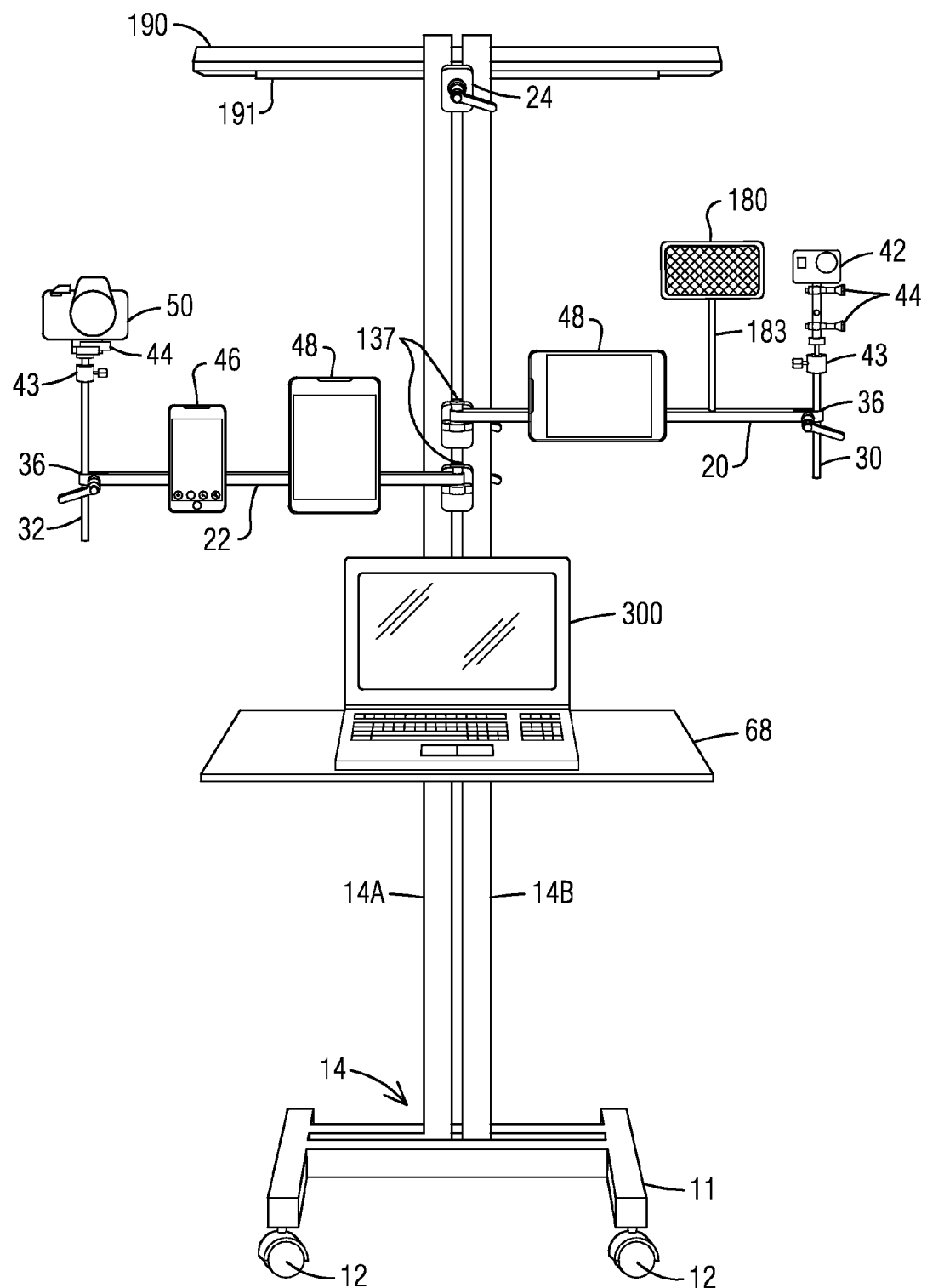
FIGS. 10, 11, and 12 illustrate other possible embodiments of the mobile multimedia workstation of the present invention.

FIG. 10 illustrates an embodiment of the mobile work station of the present invention for supporting a laptop computer 300 on the platform 68. Like the other figures, FIG. 10 illustrates one of many possible variations for supporting various electronic devices by the multimedia workstation 10.

Figure 11:
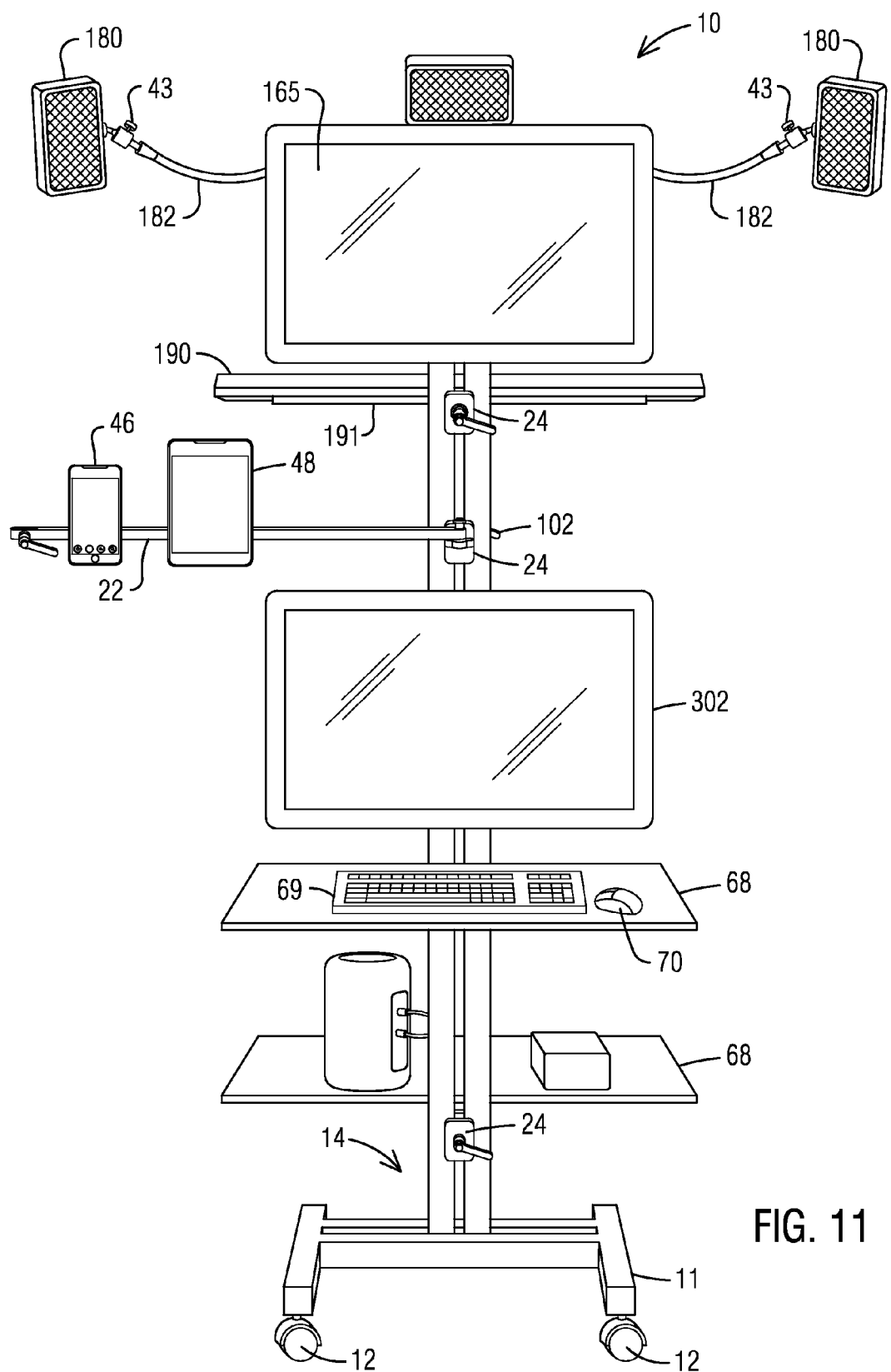

In the FIG. 11 embodiment a monitor 302 is attached to the upright member 14. In one embodiment the attachment components illustrated in FIG. 7 can be used to attach the monitor 302. With the dual monitors, the FIG. 11 embodiment may be especially attractive for use by gamers as the capability to tilt and swivel the monitors 165 and 302 may be advantageous.

Figure 12:
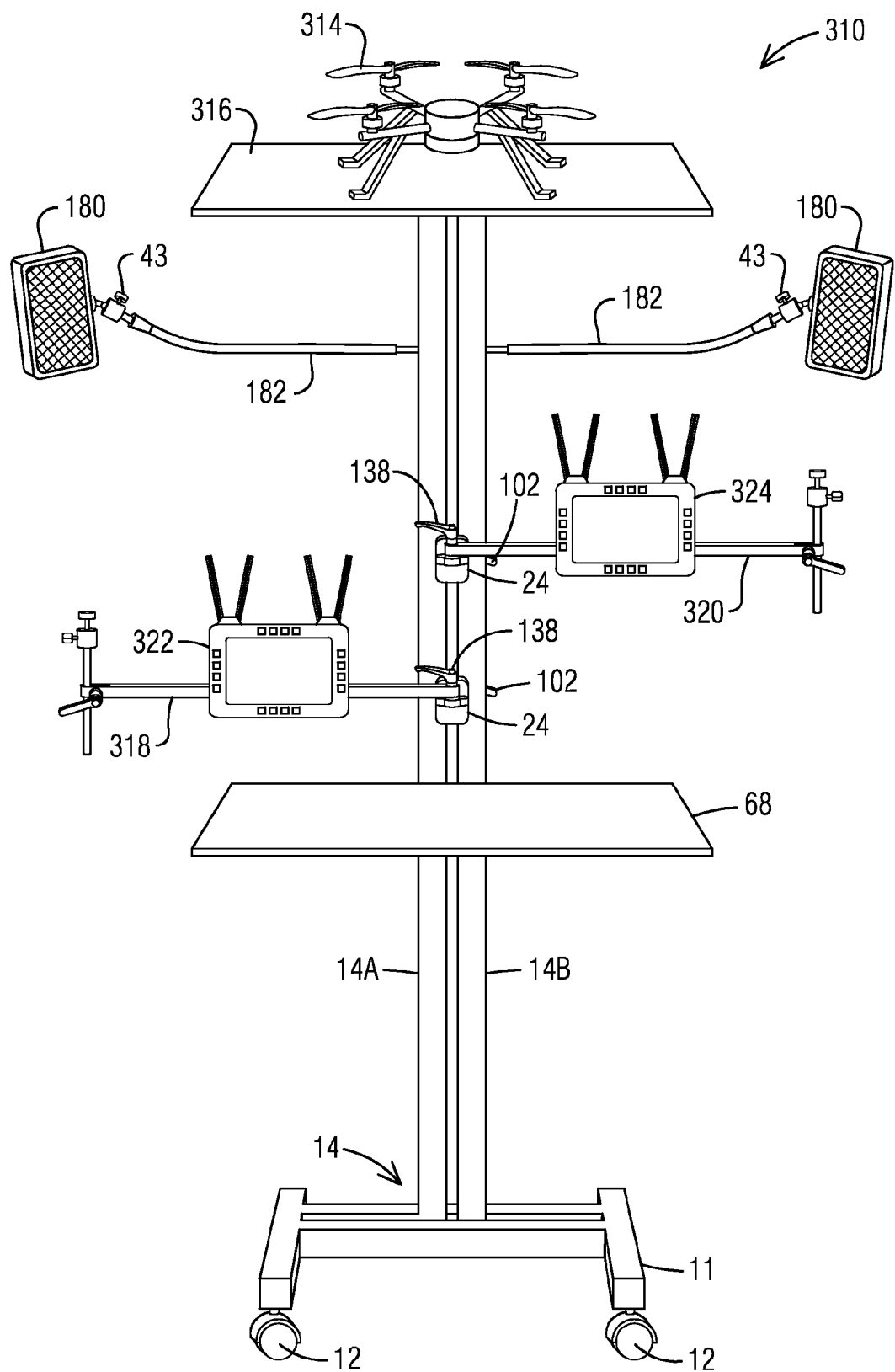

FIG. 12 illustrates a drone controller station 310 comprising a drone 314 on a pad 316 for use as a landing and take-off surface. The pad 316 may be attached to the upright member 14 such as by using the arm 96 as illustrated in FIGS. 2A and 2B or by inserting a fastener through the pad 316 and affixing the fastener in a top surface of the upright member 14.

Arms 318 and 320 support respectively a drone controller 322 and a drone camera controller 324. The platform 68 can serve as an equipment platform for supporting various devices, such as a laptop computer, battery charger (for the drone battery) and a power supply.

The quick release handle 138 secures the arms 318 and 320 to the clamp 24 to avoid accidental disengagement of those two parts from each other.

The mobile multimedia workstation allows configuring and orienting various controlling, video, and audio devices associated with operation and control of the drone 314 (tethered or wireless). The video devices can be used to capture or receive streamed real-time imagery, video, and still photos as captured by a camera aboard the drone 314. Audio devices can capture and receive sound. As this embodiment illustrates, the structural variability of the mobile multimedia workstation offers limitless supporting and attachment components for use with multiple devices in multiple configurations and orientations.

The wide range of available adjustments for the various devices attached to or extending from the upright member 14 permits a fine degree of control over device position and orientation. When used in a media environment, production parameters such as lighting color, lighting intensity, camera angles, camera positioning, comfort, productivity, mobility and the like can be conveniently adjusted.

To erect the workstation, the user may assemble the upright member; attach and adjust all attachment mechanisms, clamps and shelves; and attach and configure their electronic devices (such as cameras, microphones, displays, speakers, power supplies, wiring, computers, smart phones, tablets, computer peripherals, LED lights, and the like). Preferably, quick-release and three-axis adjustment of all devices is possible using various attachment components.

The invention may be used for photo and video recording; video teleconferencing; real-time video streaming; as a telecommuting platform with screen sharing, annotation, script or cue-card reading for narration or the like. The device is capable of assisting with: the production of artwork, video editing, photo editing, engineering drawings, cloud computing, software development, carriage and operation of medical equipment in health environments, mobile recording (such as document discovery matters, deposition video recording, video recording of document execution and training), close-up (macro) photography of a wide variety of subjects (such as food, items for sale online, items for sale in print catalogs or archival photography for insurance purposes), mobile presentations (of equipment and content), mobile computing, video teleconferencing and many other uses.

It should be understood, of course, that the foregoing relates to exemplary embodiments of the invention and that modification may be made without departing from the spirit and the scope of the invention as set forth in the following claims.

What is claimed is:

1. A mobile multimedia workstation comprising:
a base further comprising a bottom side and a top side;
at least one mobile component attached to the bottom side of the base;
first and second upright members attached to the top side of the base and spaced apart to define an opening therebetween;
a first clamp comprising first and second clamp faces connected by an adjustable connecting member disposed within the opening defined between the first and second upright members, the adjustable connecting member adjustable to urge the first and second clamp faces in a direction toward each other and thereby applying a compressive force between the front and rear surfaces of the first and second upright members fixing a vertical position of the first clamp along the first and second upright members;
a first arm having a first end connected to the first clamp face through a pivot junction and a second end defining a slot therein;
a first post for receiving within the slot;
a first device connected to the first arm;
a threaded slot member disposed through the slot for adjusting a slot width to restrain the first post within the slot; and
the first clamp further comprising first and second spaced-apart protrusions extending inwardly from the first clamp face and disposed within the opening defined between the first and second upright members.

2. The mobile multimedia workstation of claim 1 wherein the mobile component comprises two or more wheel casters.

3. The mobile multimedia workstation of claim 1 the first and second upright members each comprising a plurality of separable upright segments having protrusions in a first one of the plurality of upright segments for receiving with an opening in a second one of the plurality of upright segments.

4. The mobile multimedia workstation of claim 1 further comprising a second clamp, an articulating arm attached to a first clamp face of the second clamp and wherein the articulating arm provides movement along at least one axis.

5. The mobile multimedia workstation of claim 1 comprising a vertically adjustable platform attached to the first and second upright members.

6. The mobile multimedia workstation of claim 5 the platform attached at any location along a length of the first and second upright members or atop the first and second upright members, the platform for use as a landing and a take-off surface for a drone, the workstation further comprising one or both of a drone controller and a drone camera controller moveably affixed to the first arm.

7. The mobile multimedia workstation of claim 1 the first clamp further comprising first and second elongated clamp members disposed between the first and second upright members, a first end of each of the first and second elongated clamp members fixedly mounted to the first clamp face and a second end of each of the first and second elongated clamp members extending freely through a respective opening in the second clamp face, as a distance between the first and second clamp faces is reduced by action of the adjustable connecting member second ends of the first and second elongated clamp members extend outboard of the second clamp face.

8. The mobile multimedia workstation of claim 7 the adjustable connecting member comprising a threaded adjustable connecting member and the workstation further comprising a handle connected to the threaded adjustable connecting member, wherein rotation of the handle moves the first clamp face in a direction toward the second clamp face.

9. The mobile multimedia workstation of claim 8 wherein the handle comprises a clutch handle, a clutch of the clutch handle activated by depressing a button proximate the handle such that the handle can be freely turned without moving the first clamp face in a direction toward the second clamp face.

10. The mobile multimedia workstation of claim 7 further comprising first and second springs concentrically mounted on the respective first and second elongated clamp members.

11. The mobile multimedia workstation of claim 1 the first clamp further comprising a boss on an outwardly-facing surface of the second clamp face, the boss connected to the pivot junction for receiving the first arm.

12. The mobile multimedia workstation of claim 1 further comprising a handle threadably engaging the threaded slot member for turning the threaded slot member for adjusting the slot width.

13. The mobile multimedia workstation of claim 12 wherein the handle comprises a clutch handle, a clutch of the clutch handle activated by depressing a button proximate the handle such that the handle can be freely turned without turning the threaded slot member.

14. The mobile multimedia workstation of claim 1 the pivot junction comprising a boss extending outwardly from the first clamp face and a first opening defined in the boss, a second opening defined in the first end of the first arm, and a pin passing through the first and second openings to attach the first arm to the first clamp face through the pivot junction.

15. The mobile multimedia workstation of claim 1 the pivot junction comprising a boss extending outwardly from the first clamp face and a first opening defined in the boss, a second opening defined in the first end of the first arm, a threaded pin passing through the first and second openings and a threaded handle threadably engaging the threaded pin to attach the first end of the first arm to the boss.

16. The mobile multimedia workstation of claim 15 the first arm comprising a handle attached thereto for carrying the first arm after separated from the first clamp.

17. The mobile multimedia workstation of claim 1 further comprising a second clamp comprising first and second clamp faces connected by an adjustable connecting member disposed within the opening defined between the first and second upright members, the adjustable connecting member adjustable to urge the first and second clamp faces in a direction toward each other and thereby in contact with front and rear surfaces of the first and second upright members fixing a vertical position of the second clamp along the first and second upright members;
a boss extending outwardly from the second clamp face;
a first end of a connecting member attached to the boss;
a second end of the connecting member attached to a plate;
the plate attached to the rear surface of a second device; and
wherein the member allows tilting up/down and swiveling left/right of the second device.

18. The mobile multimedia workstation of claim 1 wherein the first device comprises a camera, a smart phone, a tablet computer, a light source, or an LED panel, and wherein the first device is adjustable relative to the arm.

19. The mobile multimedia workstation of claim 1 further comprising a second clamp comprising first and second clamp faces connected by an adjustable connecting member disposed within the opening defined between the first and second upright members, the adjustable connecting member adjustable to urge the first and second clamp faces in a direction toward each other and thereby in contact with front and rear surfaces of the first and second upright members fixing a position of the second clamp along the first and second upright members;
a second arm extending outwardly from the first clamp face;
a platform attached to the second arm; and
wherein loosening the connecting member permits raising or lowering of the platform along the first and second upright members.

20. The mobile multimedia workstation of claim 1 further comprising one or more LED panels each rigidly or adjustably attached to one or both of the upright members, an adjustable LED panel for supplying accurate lighting with regard to color, temperature, and contrast.

* * * * *